Aug. 21, 1934.    N. L. DERBY    1,971,135
HEATING SYSTEM FOR VEHICLES
Filed Dec. 20, 1928
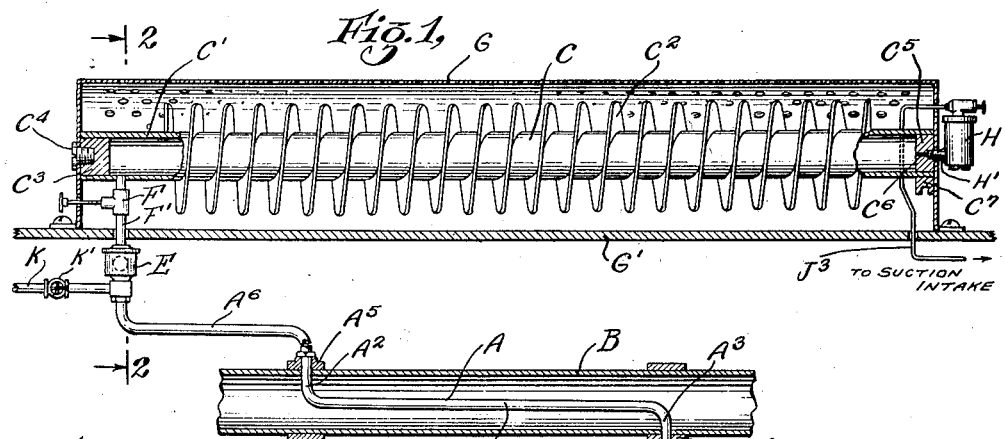
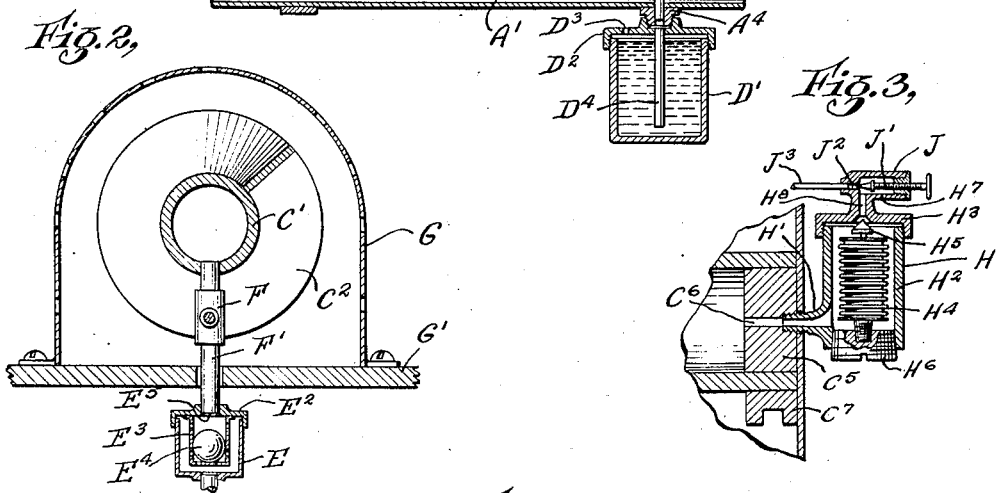
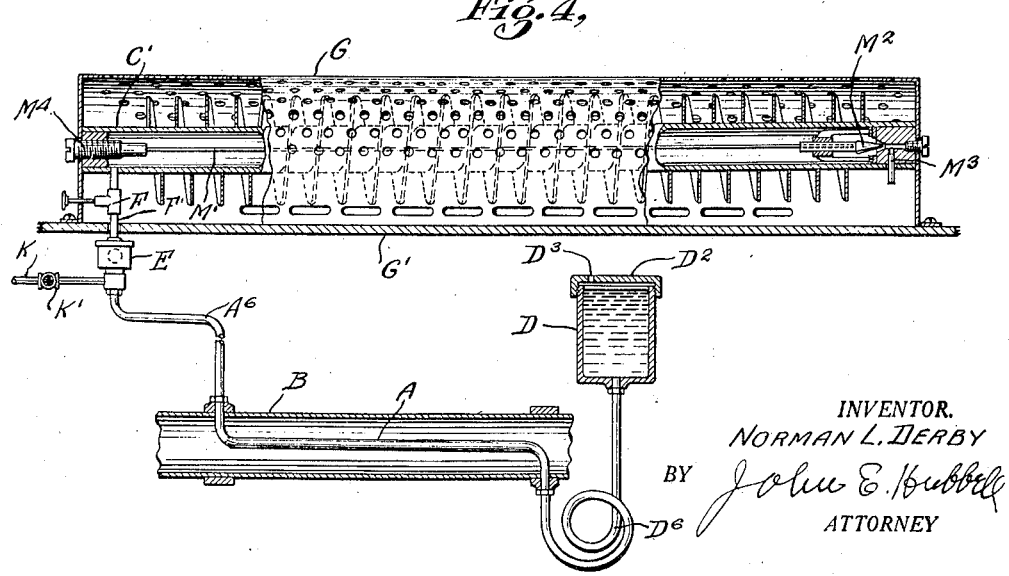
INVENTOR.
NORMAN L. DERBY
BY John E. Hubbell
ATTORNEY Patented Aug. 21, 1934

1,971,135

UNITED STATES PATENT OFFICE 1,971,135

HEATING SYSTEM FOR VEHICLES

Norman L. Derby, New York, N. Y., assignor, by mesne assignments, to Foster-Vernay Corporation, Pittsburgh, Pa., a corporation of New York Application December 20, 1928, Serial No. 327,335

8 Claims. (Cl. 237—12.3)

The present invention relates to vapor heating systems for vehicles and particularly for automobiles and the like and the object of my invention is to provide an improved construction of a vapor heating system which is characterized by a simplified manual control for rendering the system effective or ineffective, automatic operating means for removing air and other non-condensable gases from the system, automatic control of the amount of vapor in circulation, and an improved arrangement for supplying heating liquid to the system.

The various features of novelty which characterize my invention are pointed out with particularity in the claims annexed to and forming a part of this specification. For a better understanding of the invention, however, and the advantages possessed by it reference should be had to the accompanying drawing and descriptive matter in which I have illustrated and described preferred embodiments of the invention.

In the drawing:

Fig. 1 is a sectional elevation with parts broken away of one embodiment of my invention;

Fig. 2 is a section on the line 2—2 of Fig. 1;

Fig. 3 is an enlarged sectional view of a portion of the apparatus of Fig. 1; and Fig. 4 is a view similar to Fig. 1 of a modified form of my invention.

In the drawing and particularly in Figs. 1 to 3 I have illustrated a preferred embodiment of my invention in which a heating element, shown as an elongated metallic tube A located in the exhaust gas conduit B of an internal combustion engine mounted on an automobile vehicle, is connected to a radiator C positioned in the interior of the vehicle. Arrangements are made to permit a circulation of the vehicle atmosphere around the radiator. The heating element has an inclined body portion $A'$ and vertical end portions $A^2$ and $A^3$ secured in the conduit B, the upper end $A^2$ being connected to a radiator element C in a manner hereinafter described and the lower end portion $A^3$ to a heating liquid reservoir D suitably supported from the conduit B. The reservoir D consists of a cylindrical casing $D'$ closed at its lower end and provided at its upper end with a cover $D^2$ threaded thereon. The cover $D^2$ is formed with a small air port $D^3$ at one side thereof and connected to a bushing $A^4$ on the lower end of the heating element to provide a fluid-tight connection between the lower end of the heating element and an open ended pipe $D^4$ depending from the cover $D^2$. The upper end of the heating tube is connected through an internal bushing $A^5$ and tube $A^6$ to a check valve E, preferably of the ball-float type. The check valve is connected through a conduit $F'$, passing into the interior of the vehicle, and a manually operated control valve F, located in the conduit $F'$ and of a usual type, to one end of the radiator C.

In the construction illustrated the radiator comprises an elongated inclined tube $C'$ having a helically wound radiating fin $C^2$ mounted on the outer surface and extending substantially throughout the length thereof. The tube $C'$ is positioned in and spaced from an elongated perforated casing G, preferably mounted on the floor $G'$ of the vehicle. The tube $C'$ is closed at its end adjacent the control valve F by a sealing plug $C^3$, which assists in supporting the radiator tube in its casing by engagement with a screw $C^4$ passing through the corresponding end of the casing. The opposite end of the tube $C'$ is closed by a plug $C^5$ having a small passage $C^6$ therein which provides communication between the interior of the tube and a casing extension $H'$ of a thermostatic valve H externally of the casing G. A bracket $C^7$ aids in supporting this end of the tube $C'$.

As shown in detail in Fig. 3 the valve H comprises a cylindrical valve casing $H^2$ closed at its upper end by a cover $H^3$ threaded thereon. A hollow longitudinally expansible collapsible element, preferably in the form of a metallic bellows $H^4$ filled with a highly volatile liquid, is positioned in the valve casing and provided with a tapered valve $H^5$ at its upper end. The lower end of the bellows is threaded in a plug $H^6$, which is vertically adjustable in the valve casing. The valve cover is formed with a boss $H^7$ having a vertical passage $H^8$ therein positioned over the valve $H^5$ and small enough to prevent rapid changes in pressure in the system. With the valve construction described, the parts are adjusted so that the bellows will expand when gases from the tube C at a predetermined temperature contact with the bellows $H^4$. Other thermostatic elements such as the so-called "air-rid" valve may be used in lieu of the valve H.

A manually operated needle valve J is positioned in the boss $H^7$ and provided with an axially movable valve element $J'$ to open and close a lateral passage $J^2$. A conduit $J^3$ connects the passages $J^2$ and $H^7$ with a point in the air intake manifold of the vehicle engine having the desired minus pressure. The suction at this point should be sufficient to produce a pressure in the radiator tube of approximately a half pound below atmospheric when the valves H and J are open.

The check valve E heretofore mentioned consists, as shown in Fig. 2, of a casing E' connected at its lower end to the conduit $A^6$ and provided with a cover $E^2$. A perforated cage $E^3$ depends from the under side of the valve cover in spaced relation with the bottom and side walls of the casing. A ball-float $E^4$ is arranged to move vertically in the cage. In its uppermost position the float seats in a recessed opening $E^5$ in the cover plate to which the conduit F' is connected.

The heating system is connected with a source of heating liquid supply, preferably the vehicle engine cooling system, by a conduit K connected to the conduit $A^6$ directly below the check valve E. A cut-off valve K', positioned in the conduit K, controls the supply to the liquid reservoir D.

With the parts constructed and arranged as described and the vehicle engine at rest the valve K' is opened to permit a gravity flow of heating fluid to the reservoir D until the latter overflows through the port $D^3$. The supply valve is then closed and the system is ready for operation. The control valve F and needle valve J are then manually opened and the engine started. The suction produced by opening the connection to the engine intake manifold causes air present in the system to be withdrawn and the pressure in the radiator tube falls below atmospheric. The atmospheric pressure exerted through the port $D^3$ on the liquid in the reservoir D forces some of the latter up through the pipe $D^4$ into the heating tube A and check valve E. The liquid entering the valve E causes the ball to rise in the cage until it closes the connection to the conduit F', thereby preventing liquid from passing directly to the radiator tube. A portion of the liquid in the heating tube A is vaporized by the hot exhaust gases contacting with the latter and passes upwardly through the conduit $A^6$ into the valve E. The increasing vapor pressure in the valve E forces a portion of the liquid therein back towards the reservoir D. The resulting drop in liquid level causes a corresponding change in position of the float, and permits the vapor to pass upwardly through the conduit F' into the radiator tube. After several fluctuations of the liquid level in the valve E, the amount of vapor generated is sufficient to maintain the valve open. The needle valve J and thermostatic valve H being open, air remaining in the tube C' is gradually forced out by the entering vapor. The thermostatic valve remains open until sufficient vapor contacts with the bellows to vaporize the liquid therein and expand the bellows to close the connection to the engine intake manifold. The heating system being cut-out, the heating effect will then depend on the amount of vapor condensing in the radiator tube. The condensing vapor in the radiator tube causes a partial vacuum therein, which permits liquid to remain in the heating tube and be vaporized to replace the vapor condensing. An equilibrium point is gradually reached at which the liquid remains at a certain point in the heating tube and the amount of vapor generated equals the vapor condensed. The condensate is returned to the heating tube by the inclination of the radiator tube. In normal operation after the point of equilibrium has been reached, the pressure in the system remains slightly below atmospheric.

If air contained in the heating liquid and other non-condensable gases are present in such quantities that the pressure of the liberated gases is sufficient to force the heating liquid out of the tube A into the reservoir, then the lack of vapor generated will cause the temperature in the radiator tube to fall to a point where the thermostatic valve opens. When this occurs the engine suction again comes into effect and the gases present pass off through the conduit $J^3$. Normally, however, the temperature and pressure is substantially constant and remains so until the control valve F is operated to put the heating system out of service. In that case, the temperature in the radiator gradually falls until the thermostatic valve is opened. Any gases present when the valve F is closed will be drawn off through the conduit $J^3$.

The heating liquid in use is preferably an anti-freeze mixture to prevent the heating system and engine cooling parts from freezing. I preferably use a mixture including water and a liquid having a higher boiling point than water, such as glycerine, or low freezing liquid such as carbontetrachloride.

To reduce the amount of liquid being constantly evaporated to atmosphere from the reservoir D, I construct the reservoir casing of a material having a high coefficient of thermal conductivity and the parts maintaining contact between the heating element and the reservoir of material having a low thermal coefficient to decrease the heat transfer to the reservoir liquid.

In Fig. 4 I have illustrated a construction showing the construction of Figs. 1 to 3, modified to operate above rather than below atmospheric pressure. In the construction of Fig. 4, the reservoir D is raised sufficiently to ensure heating liquid being present in the heating element while the system is operating. As the air is expelled from the radiator tube by pressure, no connection to the engine intake manifold is necessary and either the needle valve J or thermostatic valve H can be eliminated. In the construction shown, a thermostatic valve M comprising an expansible rod M', having a valve element $M^2$ at one end thereof, is substituted for the type of valve shown in Fig. 3. The valve M automatically controls a passage $M^3$ leading to atmosphere. At its opposite end the rod M' is provided with a portion $M^4$ threaded in the sealing plug $C^3$ by which the rod may be adjusted. As the liquid level can not rise above a predetermined point, the check valve E may also be eliminated, if desired. In this construction the amount of vapor in the system is limited by the pressure on the vapor side of the liquid in the heating element. When this exceeds a predetermined value, the liquid is driven from the heating tube into the reservoir D. The connection between the heating tube and reservoir is formed with a vapor trap $D^6$ to prevent the escape of vapor through the reservoir to atmosphere. When the control valve F is closed, the vapor pressure in the conduit $A^6$ and heating tube is sufficient to force the liquid out of the tube into the reservoir.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention what I claim as new and desire to secure by Letters Patent, is:

1. A heating system for an automotive vehicle having an exhaust gas conduit, comprising a vapor generator in heat exchange relation with the conduit to absorb heat from the exhaust gases, a condenser-type radiator, means connecting said vapor generator and radiator for conducting vapor to the radiator and returning condensate to the vapor generator, a liquid reservoir connected to atmosphere so as to subject the surface of the liquid to atmospheric pressure, said reservoir having a connection to said vapor generator and being disposed at a lower level than the vapor generator, and a conduit connected to a source of vacuum for withdrawing from the system non-conducting gases such as air so as to lift liquid from the reservoir to the vapor generator.

2. A heating system for an automotive vehicle having an engine with an intake manifold and an exhaust gas conduit, comprising a vapor generator in heat exchange relation with the conduit to absorb heat from the exhaust gases, a condenser-type radiator, means connecting said vapor generator and radiator for conducting vapor to the radiator and returning condensate to the vapor generator therefrom, a liquid reservoir connected to atmosphere so as to subject the surface of the liquid to atmospheric pressure, said reservoir having a connection to said vapor generator and being disposed at a lower level than the vapor generator, a conduit connected to the intake manifold of the vehicle engine and leading from said radiator to withdraw non-condensing gases such as air from said system, and valve means controlling flow from the radiator to the intake manifold, said valve means being automatically operative to open to vent non-condensing gases from the radiator and to close to prevent the withdrawal of vaporized liquid.

3. A heating system for an automotive vehicle having an engine with an intake manifold and an exhaust gas conduit, comprising a vapor generator in heat exchange relation with the conduit to absorb heat from the exhaust gases, a condenser-type radiator, means connecting said vapor generator and radiator for conducting vapor to the radiator and returning condensate to the vapor generator therefrom, a liquid reservoir connected to atmosphere so as to subject the surface of the liquid to atmospheric pressure, said reservoir having a connection to said vapor generator and being disposed at a lower level than the vapor generator, a conduit connected to the intake manifold of the vehicle engine and leading from said radiator to withdraw non-condensing gases such as air from said system, and a float valve cooperating with the means connecting the vapor generator and radiator to permit the flow of vapor to the radiator and prevent the passage of liquid to the radiator.

4. A heating system for an automotive vehicle having an engine with an intake manifold and an exhaust gas conduit, comprising a vapor generator in heat exchange relation with the conduit to absorb heat from the exhaust gases, a condenser-type radiator, means connecting said vapor generator and radiator for conducting vapor to the radiator and returning condensate to the vapor generator, a liquid reservoir connected to atmosphere so as to subject the surface of the liquid to atmospheric pressure, said reservoir having a connection to said vapor generator and being disposed at a lower level than the vapor generator, a conduit connected to the intake manifold of the vehicle engine and leading from said radiator to withdraw non-condensing gases such as air from said system, a float valve cooperating with the means connecting the vapor generator and radiator to permit the flow of vapor to the radiator and prevent the passage of liquid to the radiator, and valve means controlling flow from the radiator to the intake manifold, said valve means being automatically operative to open to vent non-condensing gases from the radiator and to close to prevent the withdrawal of vaporized liquid.

5. A heating system for an automotive vehicle having a pipe for exhausting gases from the engine driving the vehicle comprising a condenser-type radiator, a conduit leading to said radiator, a portion of said conduit intermediate its ends being arranged to absorb heat from the hot gases passing along said pipe, means for supplying liquid heating medium to said portion of said conduit for generating vapor therein, and a float check valve in said conduit permitting the flow of vapor to said radiator but stopping flow of liquid along said conduit past the same toward said radiator, said conduit being continuously in communication with said supply means whereby closing of said float check valve prevents passage of vapor to said radiator and thereby causes backing up of heating medium from said conduit into said supply means.

6. A heating system for an automotive vehicle having a pipe for exhausting gases from the engine driving the vehicle comprising a condenser-type radiator, a conduit leading to said radiator and having a portion intermediate its ends in heat absorbing relation to the hot gases passing along said pipe, a liquid reservoir connected to atmosphere for supplying liquid heating medium to said portion of said conduit for generating vapor therein, means for withdrawing from said system non-condensing gases such as air, and a float check valve in said conduit permitting the flow of vapor to said radiator and blocking the passage of liquid to said radiator, said conduit being continuously in communication with said reservoir and the latter functioning as an expansion chamber to receive heating medium from said conduit when pressure builds up therein due to the check valve blocking said conduit.

7. A heating system for an automotive vehicle having a pipe for exhausting gases from the engine driving the vehicle comprising a condenser-type radiator, a conduit leading to said radiator, a portion of said conduit intermediate its ends being in heat absorbing relation to the hot gases passing along said pipe, a liquid reservoir connected to atmosphere for supplying liquid heating medium to said portion of said conduit for generating vapor therein, means for withdrawing from said system non-condensing gases such as air so as to cause liquid to be drawn by suction along said conduit from said reservoir, the supply of liquid heating medium made available by said reservoir exceeding the capacity of the conduit leading from the reservoir to the radiator, and a float check valve in said conduit permitting the flow of vapor to said radiator and preventing the passage of liquid to said radiator, said check valve being effective when preventing the passage of liquid to build up pressure in said conduit portion and cause heating medium to be thus pushed back from the conduit into said reservoir.

8. A heating system for an automotive vehicle having an exhaust gas conduit comprising a vapor generator in heat absorbing relation with the conduit to absorb heat from the exhaust gases, a condenser-type radiator, means connecting the vapor generator and radiator for conducting vapor to the radiator and returning condensate to the vapor generator therefrom, means for supplying liquid heating medium to said vapor generator, means for withdrawing gases from the radiator, means thermostatically controlled for interrupting withdrawal of gas from said radiator by said withdrawing means when the temperature of the gases being withdrawn reaches a predetermined temperature, and a float check valve permitting flow of vapor from said vapor generator to said radiator and preventing the passage of liquid to said radiator, said supplying means being continuously in communication with said vapor generator to receive heating medium driven therefrom by excess of pressure in the generator as compared to the pressure in the supply means, said check valve being effective when preventing the passage of liquid to prevent discharge of vapor to the radiator and thereby build up such excess pressure.

NORMAN L. DERBY.